United States Patent
Sano (10) Patent No.: US 7,565,151 B2
(45) Date of Patent: Jul. 21, 2009

(54) SYSTEM AND METHOD FOR ADAPTIVE ASSIGNMENT OF UNIQUE WORDS IN A COMMUNICATION SYSTEM

(75) Inventor: Masato Sano, Mountain View, CA (US)

(73) Assignee: Kyocera Corporation, Kyoto (JP)

( * ) Notice: Subject to any disclaimer, the term of this patent is extended or adjusted under 35 U.S.C. 154(b) by 510 days.

(21) Appl. No.: 11/338,391

(22) Filed: Jan. 23, 2006

(65) Prior Publication Data
US 2007/0173258 A1 Jul. 26, 2007

(51) Int. Cl.
*H04W 72/00* (2009.01)
(52) U.S. Cl. ............... 455/452.1; 455/450; 455/451; 455/452.2; 455/453
(58) Field of Classification Search .......... 455/450, 455/451, 452.1, 453
See application file for complete search history.

(56) References Cited

U.S. PATENT DOCUMENTS

| | | | | |
|---|---|---|---|---|
| 5,404,574 A | * | 4/1995 | Benveniste | 455/447 |
| 5,513,379 A | * | 4/1996 | Benveniste et al. | 455/451 |
| 6,496,490 B1 | * | 12/2002 | Andrews et al. | 370/329 |
| 6,889,047 B2 | * | 5/2005 | Ishida | 455/450 |
| 2004/0203832 A1 | | 10/2004 | Yongho | |
| 2005/0037763 A1 | * | 2/2005 | Hamamoto et al. | 455/447 |

FOREIGN PATENT DOCUMENTS

| | | |
|---|---|---|
| EP | 0 684 744 A2 | 11/1995 |
| EP | 1 453 337 A1 | 9/2004 |
| WO | WO 02/33848 A2 | 4/2002 |

OTHER PUBLICATIONS

Cardiere, P. et al., "Channel Allocation in SDMA Cellular System", VTC Fall 2001, IEEE 54th, Vehicular Technology Conference, Proceedings, Atlantic City, NJ, Oct. 7-11, 2001.

* cited by examiner

*Primary Examiner*—Nick Corsaro
*Assistant Examiner*—Vladimir Magloire (57) ABSTRACT

A method and system for assigning unique words in an SDMA (spatial division multiple access) communication system is provided. A network management system logically arranges cell stations into clusters of stations, and monitors for a heavy traffic condition. Responsive to determining that a heavy traffic condition exists, the network management system may 1) redistribute unique words within a single cluster; 2) move one or more cell stations from a busy cluster to a less busy cluster; or 3) create a new cluster, and move cells from one or more busy cluster into the new cluster. In this way, the communication system continually adapts so that more unique words are made available at cell stations having heavier communication demands.

9 Claims, 10 Drawing Sheets

SYSTEM AND METHOD FOR ADAPTIVE ASSIGNMENT OF UNIQUE WORDS IN A COMMUNICATION SYSTEM

FIELD OF THE INVENTION

The present invention relates generally to wireless communication systems, and more specifically to assigning unique words in an SDMA (spatial division multiple access) communication system using a base station.

BACKGROUND OF THE INVENTION

The deployment and use of wireless communication systems is dramatically increasing, with associated pressures to increase system capacity, bandwidth, and quality. One way to increase system capacity is by employing a multiple access process, which allows a scare system resource to be shared between multiple users. For example, some communication systems operate according to a TDMA (time division multiple access) process. In a TDMA communication system, a predetermined time frame is sub-divided into slots, and each user is assigned a slot for receiving and transmitting data or voice signals. In this way, multiple users are able to share the same time frame. In another example, some communication systems operate according to an SDMA (spatial division multiple access). In an SDMA system, a directable antenna array is configured to allow a particular frequency to be used by multiple users operating in the same general geographic area.

In use, each mobile user has a device that is assigned a unique word prior to initiating data or voice communication with a base station. Thereafter, from time to time, the unique word is transmitted from the remote user, which assists the base station in determining the spatial signature of the remote device. In turn, this allows the base station to configure its directable antenna to better differentiate communication signals originating from different mobile devices, even though the devices are communicating on the same frequency. In this way, an SDMA communication system allows multiple uses to share the same frequency.

In another example, some communication systems may use more than one multiple access process to further increase system capacity. For example, the PHS (personal handyphone system) communication system, which is widely deployed in Japan, combines the benefits of both TDMA and SDMA. That is, PHS divides a time frame into slots, and then assigns unique words with respect to each slot. In this way, each time frame allows for multiple users in the slots, and each slot allows for multiple access by using the same frequency. In PHS, the base station is generally referred to as the cell station, while the remote mobile device is referred to as the personal station.

The PHS system is a recognized international standard promulgated by ARIB (Association of Radio Industries and Businesses). More particularly, document RCR-STD-28 details the requirements and options available in a PHS communication system. For example, PHS, as with other SDMA communication systems, may be implemented with a limited number of available unique words. Although the unique words may be selected for low cross correlation effects, because there are a limited number available, unique words are reused throughout the PHS communication system. However, to enable the directable antenna to operate properly, it is important that the unique words for personal stations be different, and more importantly, to be different enough to support signal differentiation by the cell station. Accordingly, when a personal station makes a request to access the PHS cell station, the PHS cell station should consider which unique words are in use in an area around the requesting personal station.

With the increased usage of mobile and wireless devices, existing base stations may become overloaded with traffic, a deny access to some mobile units, or drop calls as mobile units move cell to cell. Since each cell station in a PHS system typically has a defined set of available unique words, the overall cell and system capacity is static, and is set by system managers according to expected communication traffic.

Therefore, there exists a need for a process and system for assigning unique words to achieve an improved system capacity, lower interference, and better adaptability to changing communication demands.

SUMMARY

A method and system for assigning unique words in an SDMA (spatial division multiple access) communication system is disclosed. A network management system logically arranges cell stations into clusters of stations, and monitors for a heavy traffic condition. Responsive to determining that a heavy traffic condition exists, the network management system may 1) redistribute unique words within a single cluster; 2) move one or more cell stations from a busy cluster to a less busy cluster; or 3) create a new cluster, and move cells from one or more busy cluster into the new cluster. In this way, the communication system continually adapts so that more unique words are made available at cell stations having heavier communication demands.

In a more specific example, a method and system is provided for assigning unique words in a PHS (personal handyphone system) communication system. A network management system logically arranges PHS cell stations into clusters of stations, and monitors for a heavy traffic condition. Responsive to determining that a heavy traffic condition exists, the network management system may 1) redistribute unique words within a single cluster; 2) move one or more PHS cell stations from a busy cluster to a less busy cluster; or 3) create a new cluster, and move cells from one or more busy cluster into the new cluster. In this way, the PHS communication system continually adapts so that more unique words are made available at PHS cell stations having heavier communication demands.

These and other features of the present invention will become apparent from a reading of the following description, and may be realized by means of the instrumentalities and combinations particularly pointed out in the appended claims.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
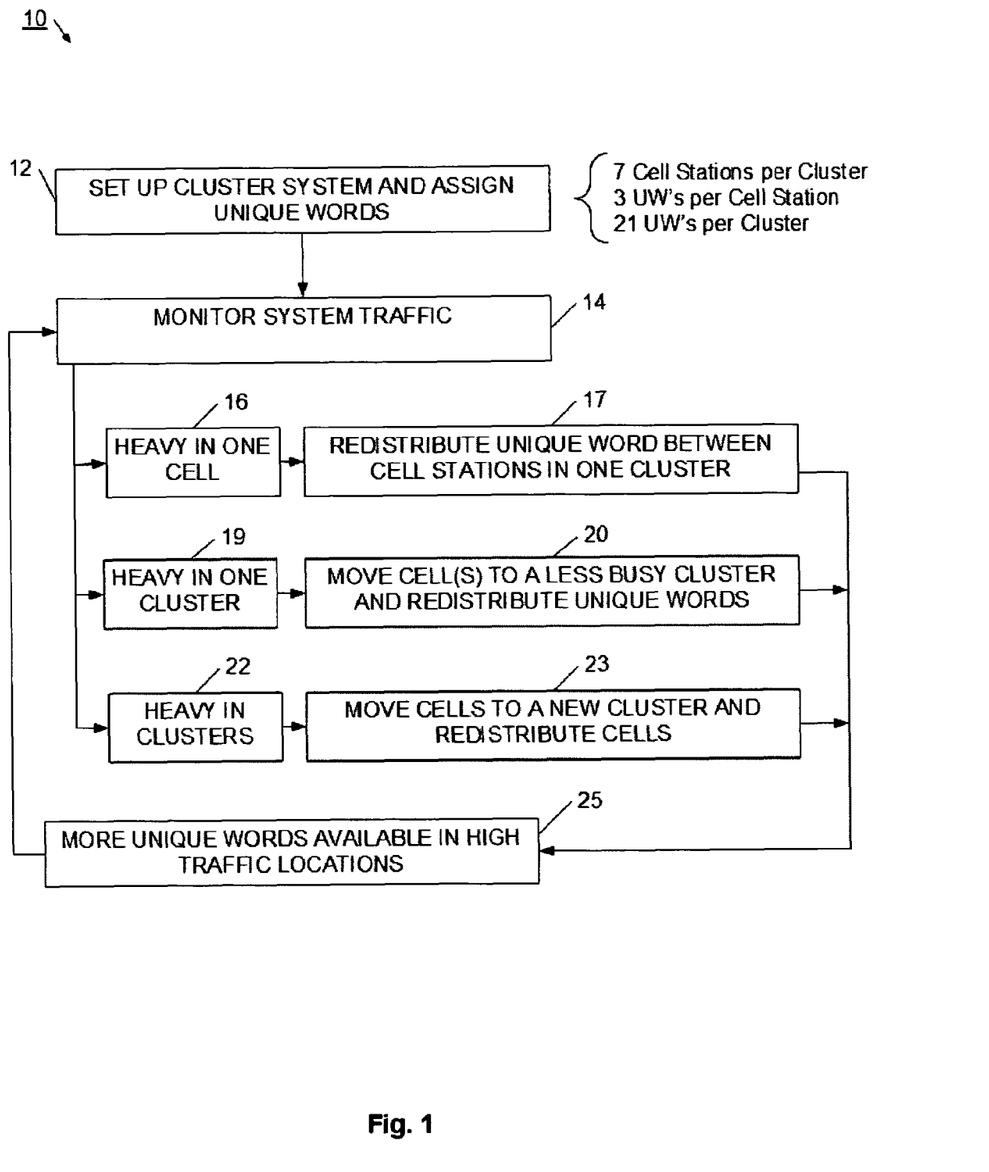
FIG. 1 is a flowchart of a method for adaptively assigning unique words in accordance with one embodiment of the present invention.

Referring now to FIG. 1, process 10 for adaptively assigning unique words for a communication system is illustrated. Process 10 is illustrated as a method operating within a PHS communication system as shown. However, it will be appreciated that other communication systems employing an SDMA (spatial division multiple access) system may be used.

The PHS Communication process typically has a set of base stations for communicating with a number of remote mobile devices. Each base station has a local area in which it communicates, which is often referred to as a "cell". Cells may be arranged in a pattern so that adjacent cells somewhat overlap. In this way, as a mobile device moves from one cell to another, one base station may hand off the communication to the other base station in an orderly and controlled manner. This handoff process is often referred to as a soft handoff or handover.

Since the PHS communication system operates according to an SDMA process, the cell station assigns each personal station a unique word responsive to an establish request. These unique words are used for determining the spatial signature of personal stations during communication processes. This spatial signature assists the cell stations in directing their antenna array, as well as in differentiating the communication signal arriving from each personal station. At termination of the communication with the cell station, the unique word is released, and is available to be assigned for another communication session.

It will be appreciated that the number of unique words available for each cell station may vary according to the particular communication system in use. Typically, a communication system has a limited number of unique words available for use, so unique words are shared and reused across the communication system. Each cell is responsible for providing transmission and reception communication within a specific but limited geographic area. Accordingly, as a mobile wireless user moves between cells, the responsibility for communicating with that personal station is transferred from one cell to another. In most cases, the base stations for cells are connected to a central office, either by wired or wireless connection. For example, the base stations may communicate with the central office through an Internet or TCP/IP connection, or may communicate through satellite, microwave, or other wireless standard. The central office, therefore, may act to provide supervisory control for the individual cell stations.

In process 10, the central office is used to logically arrange cell stations into clusters of cell stations. Each cluster may contain, for example, a predefined number of cell stations, or the number of cell stations per cluster may be adjusted according to current or expected communication needs. In a specific example, each cluster is initially assigned to have seven cell stations. Each cluster also has a defined pool of unique words that may be distributed among that clusters cell stations. For example, a cluster may be assigned 21 unique words, and if the cluster has seven cell stations, then each cell station may be distributed three unique words. In other cases, the unique words may be unequally distributed among the cell stations according to actual or anticipated communication loading. The assignment of cell stations may be made from a central office, or may be made cooperatively between cell stations in a cluster. In one example, a network manager system operates on a central station to manage the definition and assignment of unique words within a cluster. It will be appreciated that the number of clusters, the number of cell stations per cluster, the number of unique words in each cluster, and the distribution of unique words within each cluster may be adjusted according to application and communication requirements.

With the clusters defined and the unique words assigned, the communication system operates according to its PHS communication standard. Process 10 monitors communication traffic within communication system as shown in block 14. The monitoring process may be done at the central office using a network management system, or may be done within the cluster itself. For example, individual cell stations may report when they have usually high or unusually low communication traffic. In this way, other cell stations within the cluster are made aware of the resource requirements for other cells. In another example, a network management system operating on a server within a cluster or at a central office, monitors overall communication flow within the cluster, and therefore can determine immediate resource needs, and may be able to predict upcoming loading events. The network management system may also monitor the overall communication loading of the communication system. For example, the network management system may monitor traffic within individual cells, overall traffic within individual clusters, and communication traffic within the entire communication system. In this way, the network management system maintains a system-level view of current communication traffic.

As a result of monitoring the communication traffic, the network management system may determine that traffic has become unusually heavy in one cell as shown in block 16. In such a case, the network management system may redistribute the unique words between the cell stations in one cluster as shown in block 17. For example, a cell station operating with relatively low traffic may relinquish one of its unique words, and that relinquished unique word may be reassigned to the cell station having heavy loading. In this way, the burdened cell station may distribute its communication traffic over more unique words, and therefore may more readily handle current communication demand. The distribution of unique words within a cluster adapts to the immediate traffic loading. It will also be appreciated that some unique words may be reassigned to reduce correlation effects between unique words in adjacent cells. For example, if one cell is assigned a new unique word, but that unique word has a relatively high correlation with a unique word in an adjacent cell, then the adjacent cell may request that the network management system replace that unique word with another unique word having lower correlation effects. In this way, both cell stations may operate a more robust communication process.

In response to monitoring the system traffic, the network management system may find that one cluster has an unusually high level of traffic as shown in block 19. The level of traffic within the cluster may be such that a simple redistribution of unique words within the cluster is not sufficient to allow robust communication. In such a case, the network management system may move one or more cells out of the busy cluster as shown in block 20. The cluster maintains its existing pool of unique words, so now the same number of unique words may be distributed among fewer cells. Accordingly, each cell may have a higher number of unique words as compared to the originally sized cluster. Take for example a cluster having seven cells and 21 unique words. If this cluster becomes unusually busy, then one of its cell stations may be moved to an adjacent cluster. Now 21 unique words are available for distribution over six cell stations. These unique words provide a higher density of unique words for the smaller cluster, allowing a greater density of traffic communication. In moving cells out of the busy cluster, the moved cell would be moved to a less busy cluster, increasing the number of cells in that cluster. Accordingly, the moved cell station would be reassigned unique words from less busy cell stations within that cluster. Take for example where a cluster originally has seven cell stations, and a new cell station is assigned to that cluster, bringing the total to eight cell stations. If the cluster originally has 21 assigned unique words, then the 21 assigned unique words now must be distributed among eight cell stations. Typically, cell stations will be moved in a way that allows contiguous arrangements of cells. However, it will be understood that clustering is a logical process, and therefore is not constrained by physical position.

The network management system may also determine through monitoring that traffic is heavy in adjacent clusters as shown in the block 22. In this way, the mere shifting of cells from one cluster to another would not substantially alleviate the overloading problem. In such a case, the network management system creates a new cluster and moves cells from each of the heavily loaded clusters into the new cluster as shown in block 23. Take for example two adjacent clusters, each cluster having seven cells and 21 unique words each. Both clusters are heavily loaded. Accordingly, the network management system creates a third cluster and moves, for example, two cells from each busy cluster into the new cluster. As a result, the original two clusters now have five cells each, and the newly created cluster has four cells. The network management system assigns a pool of unique words to the newly created cluster, and the unique words are distributed among the four cells. Assume that the new cluster was assigned 21 unique words. Now 63 unique words are available in the geography that previously had 42 unique words. Although more unique words are available, and likely will allow for greater communication densities, the network management system may also need to redistribute numbers to reduce correlation effects between unique words in adjacent cells.

Advantageously, process 10 enables an SDMA communication system to readily and efficiently adapt to current communication loading. Responsive to detected loading, a network management system is able to efficiently redistribute unique words within a cluster, redistribute cells between or among clusters, or dynamically create or remove clusters as required. In this way, more unique words are available in high traffic cells, as shown in block 25.

Figure 2:
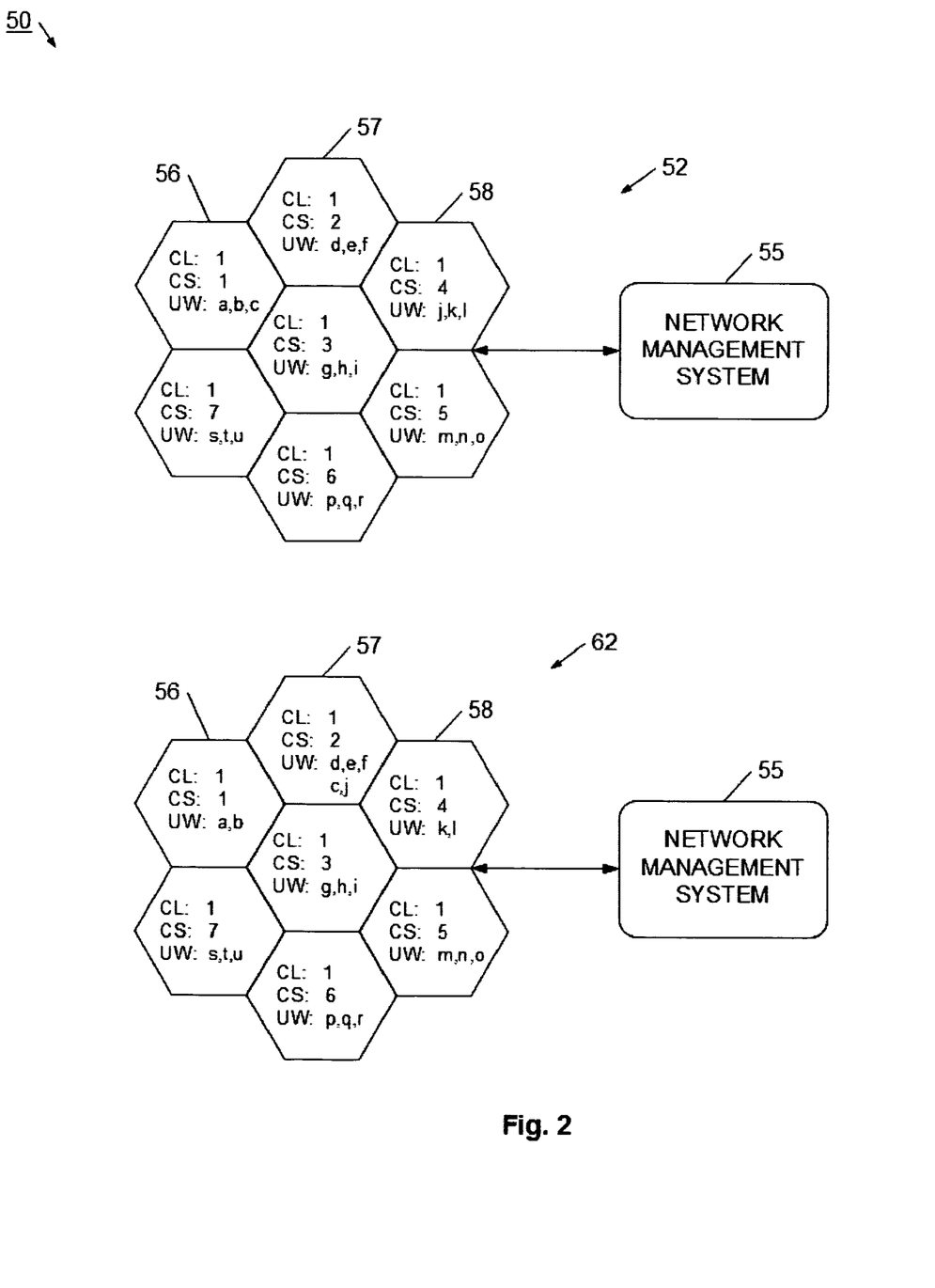
FIG. 2 is a diagram of a system for adaptively assigning unique words in accordance with one embodiment of the present invention.

Referring now to FIG. 2, system 50 for adaptively assigning unique words is illustrated. System 50 has original cluster 52 having seven individual cells, such as cell 56, 57, and 58. Although cluster 52 is illustrated with seven cells, it will be appreciated that other numbers of cells may be used. Network management system 55 communicates with cluster 52, and provides monitoring and control functions. Network management system 55 may be a central function operating at a central office facility, or may be a distributed function operating at least in part within cluster 52. As illustrated, each cell is assigned to cluster one, and is numbered 1, 2, 3, 4, 5, 6, or 7. Each cell station has three unique words, thereby having a total available pool of 21 unique words for cluster 52.

Figure 3:
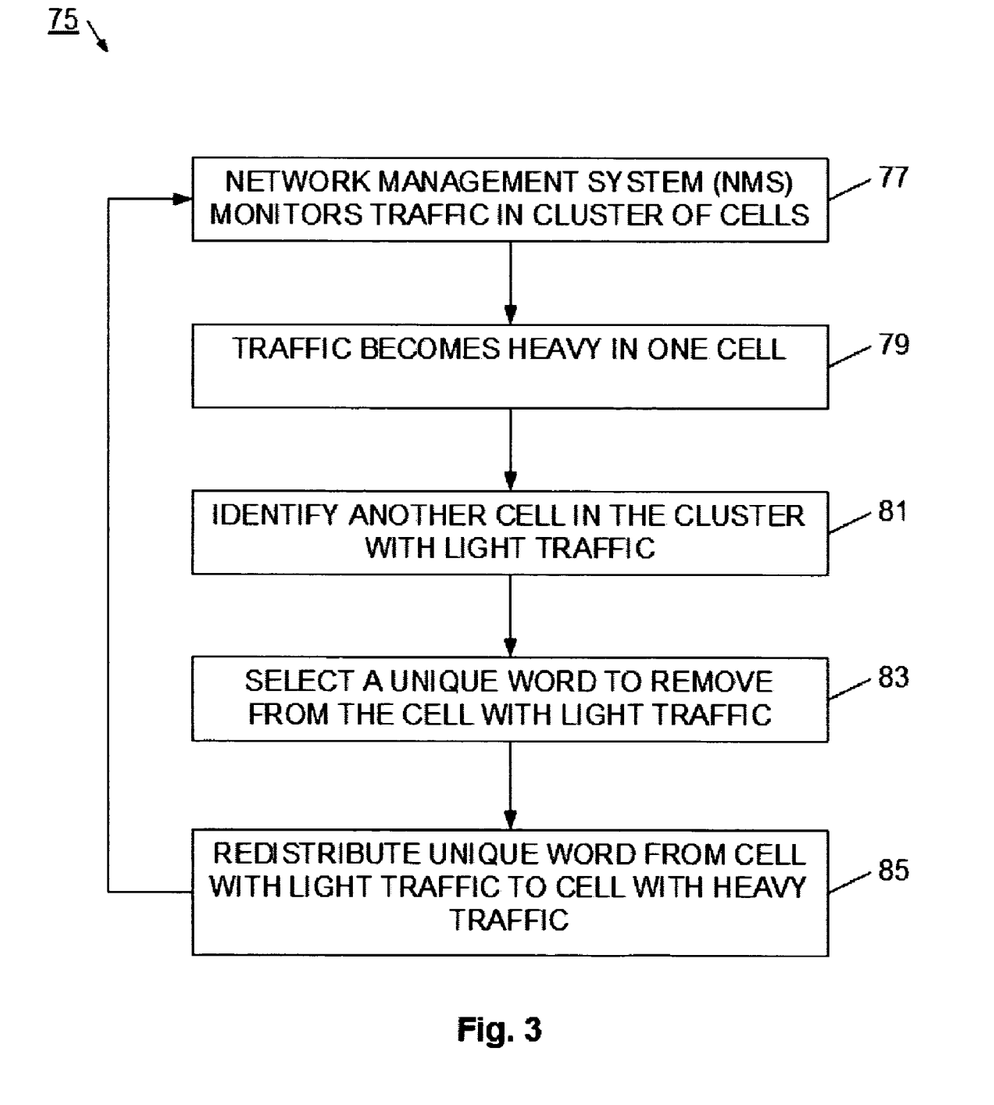
FIG. 3 is a flowchart of a method for adaptively assigning unique words in accordance with one embodiment of the present invention.

Network management system 55 operates a process, such as process 75 shown with reference to FIG. 3. The network management system monitors traffic in cluster 52 of cells as shown in block 77. Network management system 55 may determine that traffic becomes heavy in one cell as shown in the block 79. Network management system may also identify another cell within the cluster that has relatively lighter traffic as shown in block 81. Network management system 44 may then select a unique word to remove from the cell with lighter traffic as shown in block 83. The selected unique word is then redistributed and assigned to the cell having heavy traffic as shown in block 85. In one example, the unique word to be moved was selected according to its expected correlation effects in the cell it was being moved to. Referring again to FIG. 2, network management system 55 has determined that cell station 57 had unusually high traffic, and that cell station 56 and 58 had relatively light traffic, as shown in cluster arrangement 52. Accordingly, unique word "c" was relinquished from cell station 56 and reassigned to cell station 57. In a similar manner, unique word "j" was relinquished from cell station 58 and reassigned to cell station 57. Cell station 57 now operates with five total unique words, and therefore can accommodate its heavier communication world, as shown in cluster arrangement 62. It will be appreciated that the assignment of unique words within cluster 62 may be continually adapted to detected traffic flows.

Figure 4:
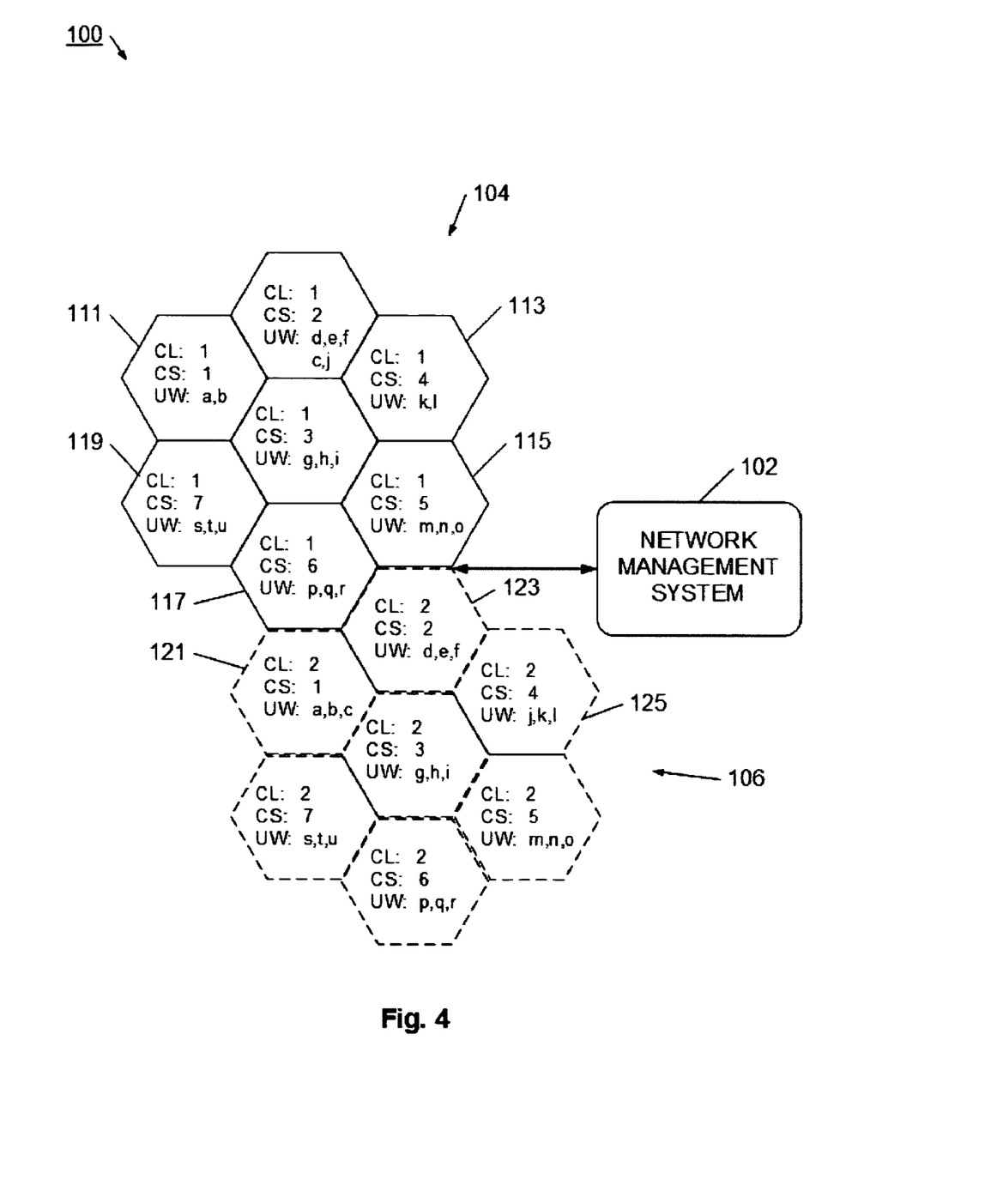
FIG. 4 is a diagram of a system for adaptively assigning unique words in accordance with one embodiment of the present invention.

Referring now to FIG. 4, system 100 for adaptively assigning unique words is illustrated. System 100 has cluster one 104 having seven cell stations, such as cell stations 111, 113, 115, 117, and 119. Each cell station within cluster 104 is identified as "CL 1", and is consecutively numbered. System 100 also has cluster two 106, which also has seven cells stations such as cell station 121, 123 and 125. Each cell in cluster two 106 is identified as "CL 2", and is also consecutively numbered. Both cluster one 104 and cluster two 106 each have 21 unique words in their respective pool. The clusters 104 and 106 communicate with network management system 102. Network management system 102 may be centrally operated at a central office, or may have some of its processing requirements distributed with in one or more cells. Network management system 102 operates an adaptive assignment process, such as process 150 shown in FIG. 6.

Figure 6:
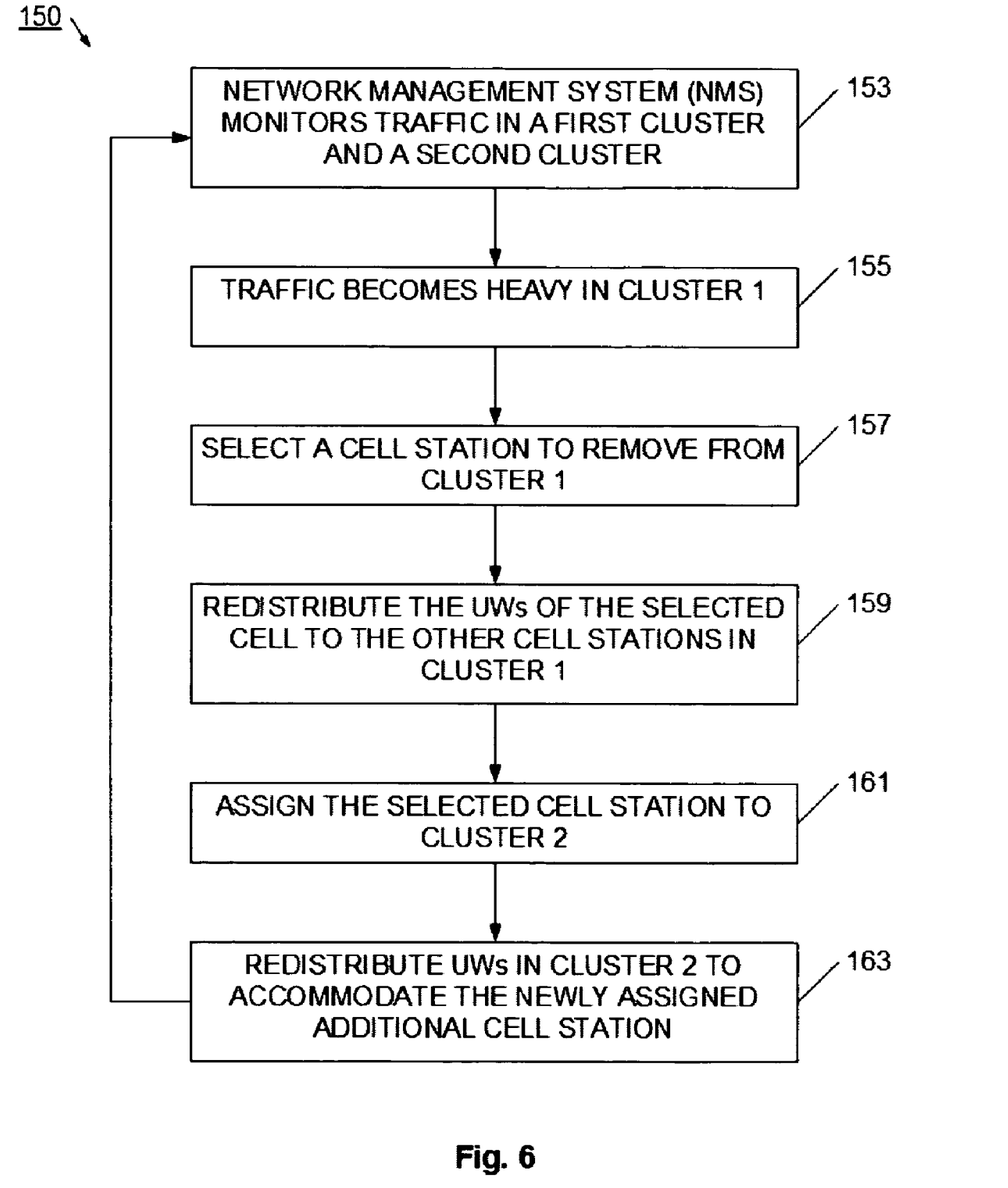
FIG. 6 is a flowchart of a method for adaptively assigning unique words in accordance with the present invention.

Network management system 102 monitors traffic in both first cluster 104 and second cluster 106 as shown in block 153.

Figure 5:
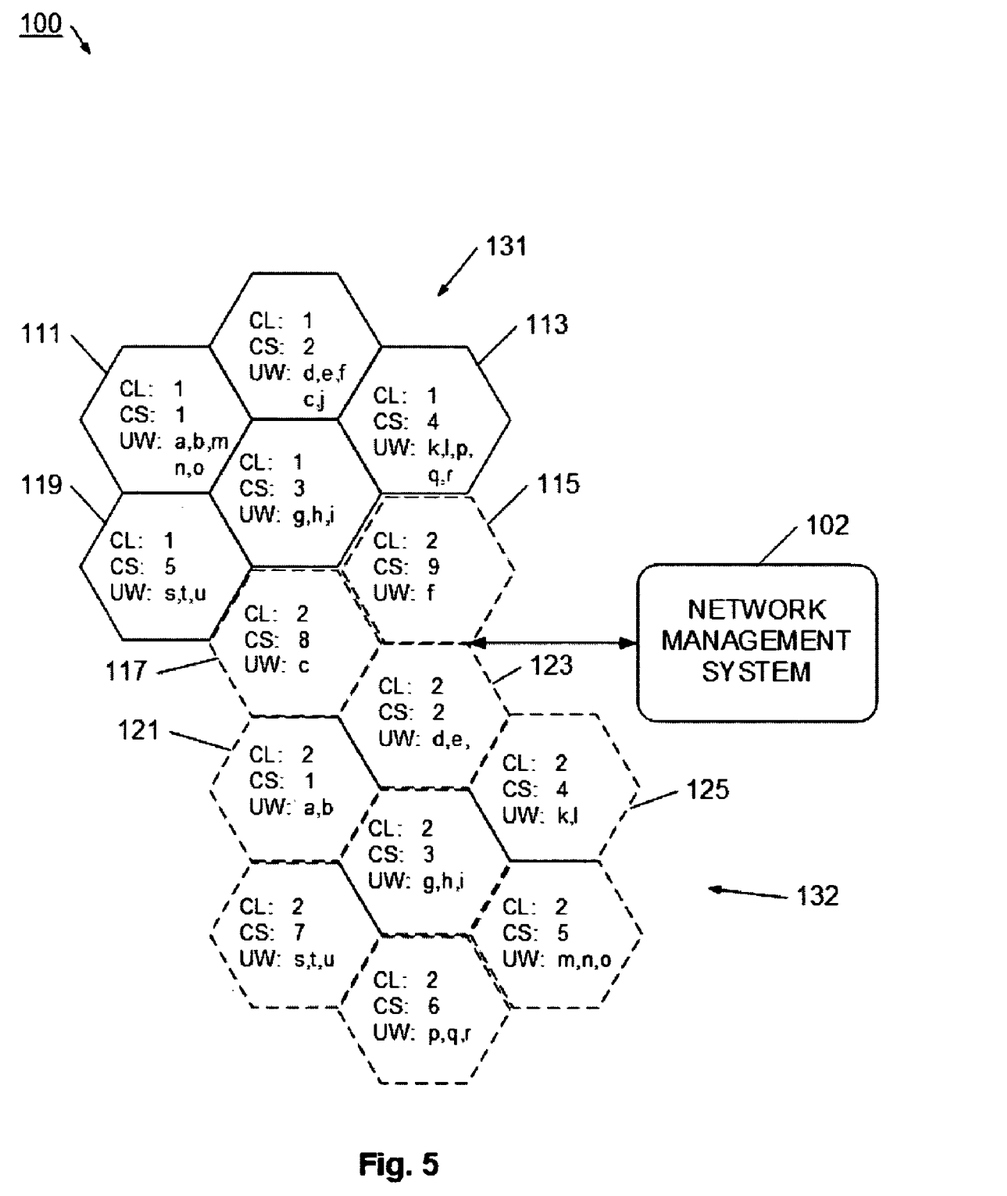
FIG. 5 is a diagram of a system for adaptively assigning unique words in accordance with one embodiment of the present invention.

Network management system 102 may determine that traffic becomes heavy in cluster one 104 as shown in block 155. Network management system 102 selects one or more cell station(s) to remove from cluster one 104 as shown in block 157. In this way, cluster one 104 has fewer cells, but has the original number of unique words. The pool of unique words is then redistributed among the remaining cell stations in cluster one as shown in block 159. The moved cell is now assigned to cluster two, as shown in block 161. The unique words in cluster two are also redistributed to accommodate the additional cell as shown in block 163. Referring to FIG. 5, the communication system 100 of FIG. 4 has been updated according to monitored traffic conditions. More particularly, network management system 102 determined that traffic had become heavy in cluster one 104, and that traffic was relatively light in cluster two 106. Accordingly, cell stations 115 and 117, which were originally assigned to cluster one, have now been assigned to cluster two. Cluster one 131 now has five total cells, while cluster two 132 now has nine total cells. Originally, cells 115 and 117 had unique words m, n, o, p, q, and r. These six unique words now have been reassigned within smaller cluster 131. For example, m, n, and o have been assigned to cell 111, and p, q, and r have been assigned to cell station 113. In this way, the cell stations within new cluster 131 may more readily accommodate heavier traffic conditions. New cluster 132 has had to redistribute unique words to accommodate the two additional cells. For example, unique word c, originally in cell station 121, has now been moved to cell station 117. In a similar manner, unique word f was originally assigned to sell station 123, and has now been reassigned to cell station 115. It will be appreciated that the unique words may be redistributed within each new cluster, or that the size of clusters may be continually adapted according to changing traffic conditions.

Figure 7:
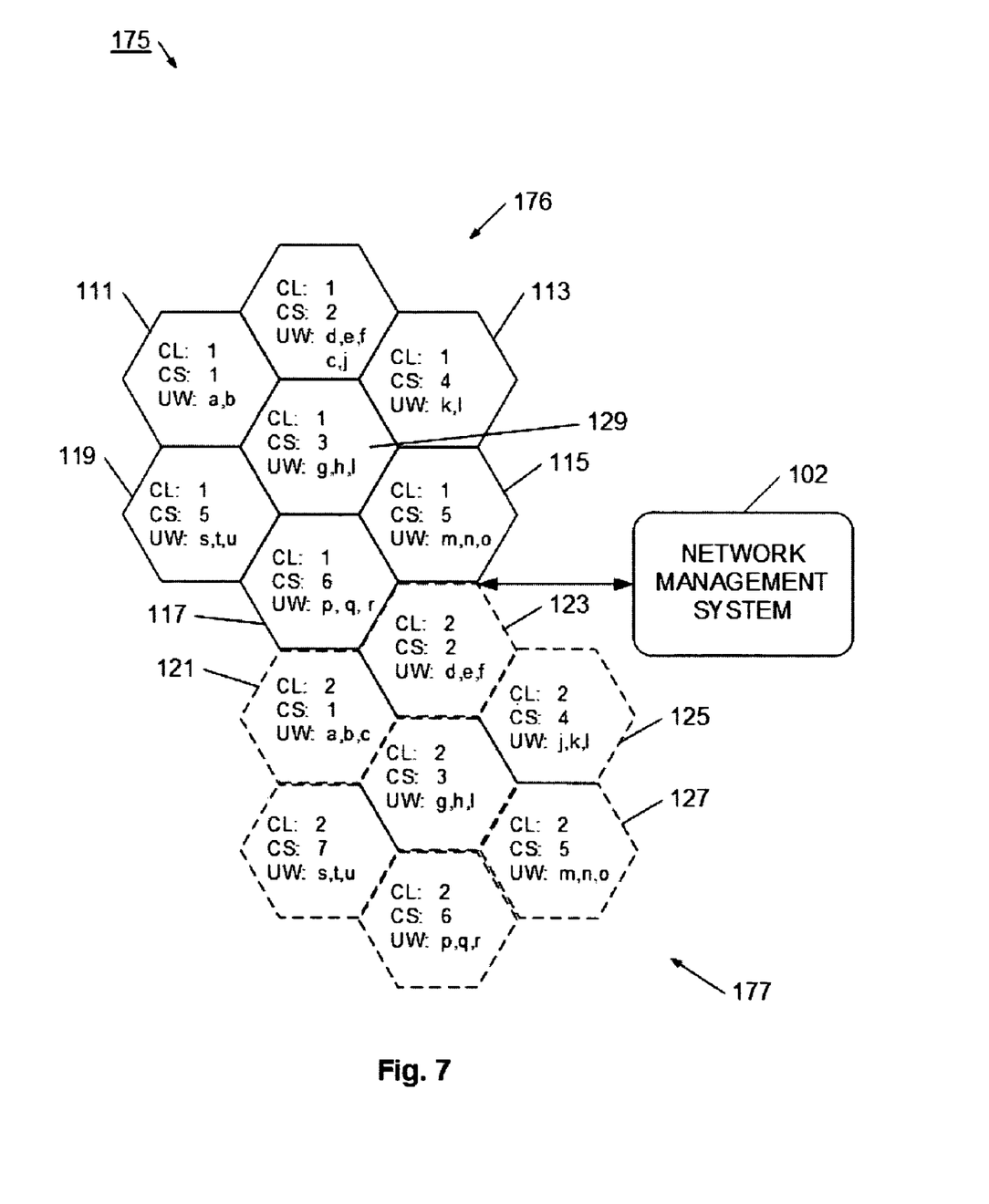
FIG. 7 is a diagram of a system for adaptively assigning unique words in accordance with the present invention.

Referring now to FIG. 7, system 175 for adaptively assigning unique words is illustrated. System 175 has first cluster 176 having seven cell stations such as cell stations 111, 113, 115, 117, 119, and 129. System 175 also has second cluster 177 also having seven cells stations such as cell stations 121, 123, 125, and 127. System 175 is monitored by network management system 102. Network management system 102 may be centrally operated on a central office processor, or may have its processes distributed between clusters or cells. Network management system 102 operates a process such as process 225 illustrated in FIG. 9. Process 225 has a network management system monitoring traffic in both a first cluster and a second cluster as shown in block 227. The network management system determines that traffic has become heavy in both cluster one and two as shown in block 229. In this way, a simple redistribution of unique words within an individual cluster, or even assignment of one cell to another cluster will not accommodate the increased traffic. Accordingly, the process 225 selects certain cells to remove from cluster one as shown in block 231.

Figure 9:
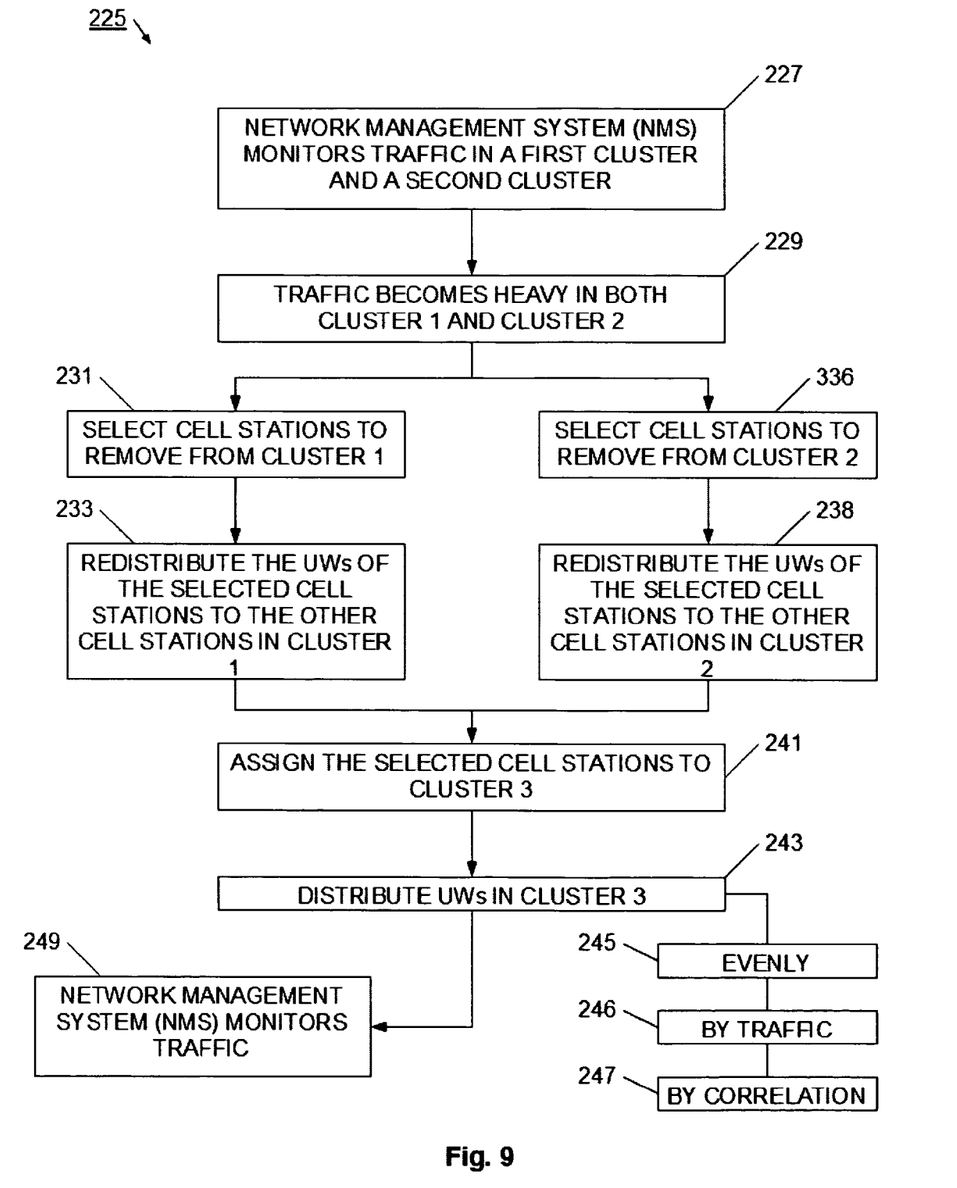
FIG. 9 is a flowchart of a method for adaptively assigning unique words in accordance with the present invention.

Since cluster one now has fewer cells but the same number of unique words, additional unique words are available for the remaining cells. In this way, cluster one may now accommodate a higher density of traffic flow. In a similar manner, the network management system selects cells to remove from cluster two. Cluster two now has fewer cells but the same number of unique words, so the unique words have been distributed over a fewer number of cells, allowing for higher communication densities as shown in block 238. Network management system 227 creates a third cluster and assigns the selected cells to the new cluster as shown in block 241.

The network management system also assigns the new cluster three a pool of available words, and those unique words are distributed among the cell stations as shown in block 243. The words may be distributed evenly among the cell stations as shown in block 245, according to monitored traffic as shown in block 246, or according to an order intended to reduce correlation effects with adjacent cells as shown in block 247. The network management system then continues to monitor traffic as shown in block 249. In this way, the network management system is able to continually adapt the communication system to current traffic conditions.

Figure 8:
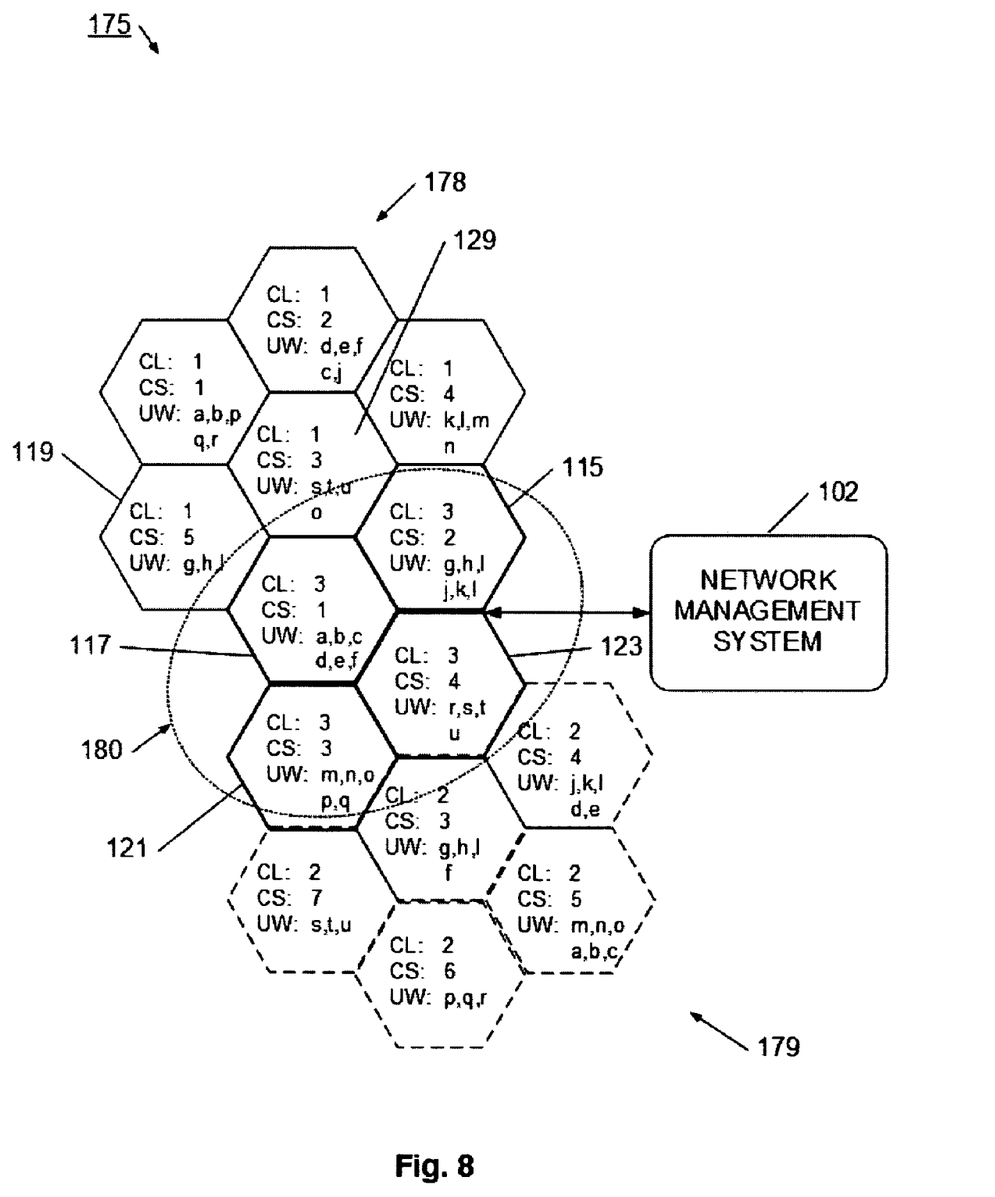
FIG. 8 is a diagram of a system for adaptively assigning unique words in accordance with the present invention.

Referring now to FIG. 7 and FIG. 8, system 175 has been adapted from its original configuration (FIG. 7) to a new configuration (FIG. 8) that is able to better accommodate heavy traffic demand. More particularly, network management system 102 monitored traffic in the original clusters 176 and 177, and found each to have a high traffic condition. Accordingly, the network management system 102 created a third cluster 180. The third cluster 180 has been assigned four cells. For example, cluster 180 has cells 115 and 117, which were previously assigned to cluster one. In a similar manner, cluster 180 now has cell stations 121 and 123 which were previously assigned to cluster two. As a result, cluster one 178 now has five cell stations, cluster two 179 now has five cell stations, and cluster three 180 has four cell stations. The unique words originally assigned to cell stations 115 and 117 have now been redistributed with in the five cell stations remaining in cluster one 178. In a similar manner, the unique words assigned to cell stations 121 and 123 were reassigned to the remaining five cells in cluster two 179. The network management system assigned a new pool of unique words to cluster three 180, and those words have been distributed among the four cells of cluster three 180. It will be understood that some redistribution of unique words in clusters one and two may be required to reduce correlation effects.

It will also be appreciated that since the overall density of unique words has been increased, the likelihood of interfering correlation effects has also been increased. As a result, in some cases it may be beneficial to reduce the number of unique words operating in a particular geographic area after traffic conditions have reduced. For example, in the system shown in FIG. 8, when traffic returns to a more normal state, then it may be desirable to eliminate cluster three 180 and reassign the cells according to the original assignments shown with reference to FIG. 7.

Figure 10:
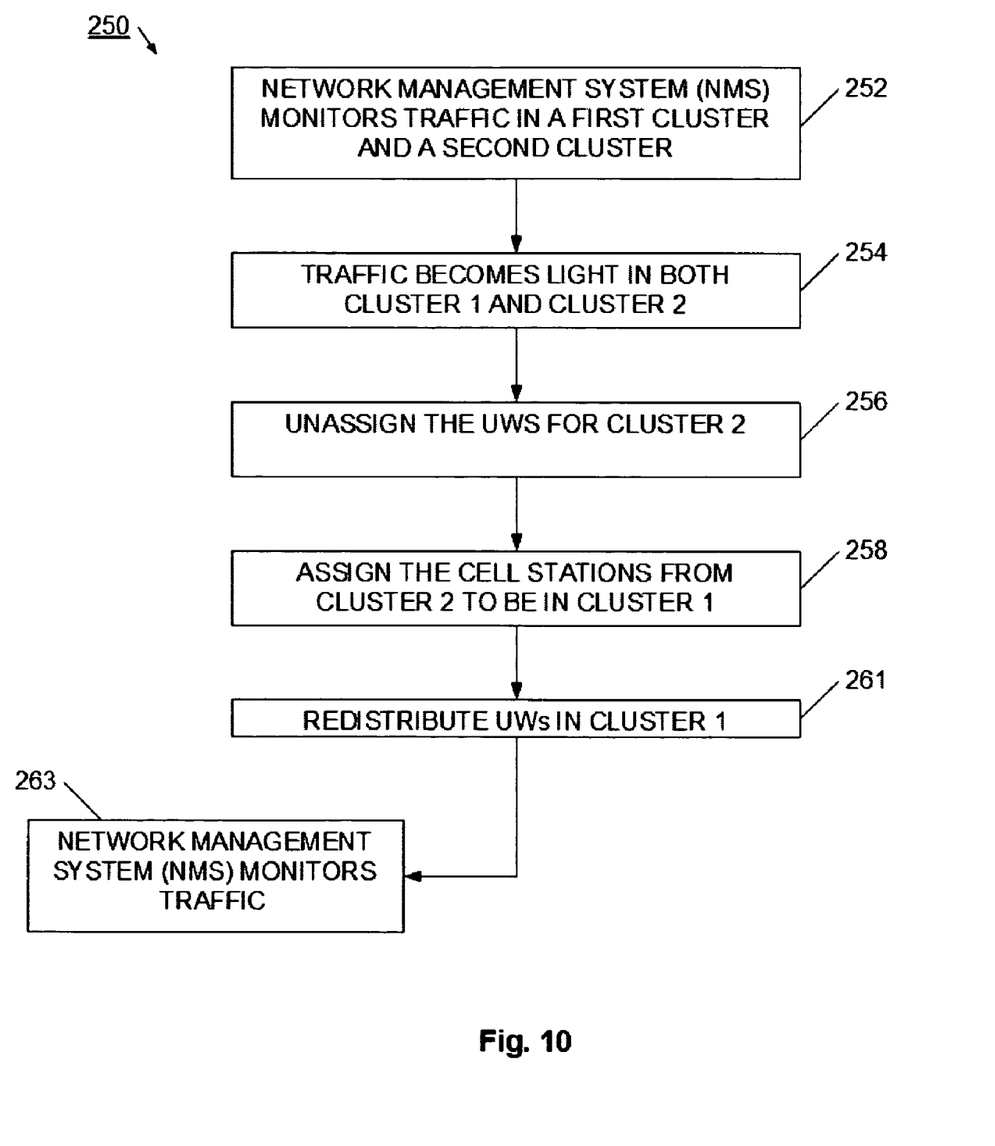
FIG. 10 is a flowchart of a method for adaptively assigning unique words in accordance with one embodiment of the present invention.

Referring now to FIG. 10, process 250 is illustrated for adaptively assigning unique words. In process 250 a network management system monitors traffic in a first and second cluster as shown in block 252. The network management system determines that traffic has become light in both clusters one and two as shown in block 254. Accordingly, the network management system may dissolve or remove cluster two, and thereby unassign the unique words within the cells of cluster two as shown in block 256. The cells originally within cluster two are now assigned to cluster one as shown in block 258. The unique words within cluster one are then redistributed among the higher number of cells as shown in block 261. In this way, the assignment of a fewer number of unique words in a particular geographic area may reduce the risk of undesirable correlation effects with adjacent cells. The network management system then continues to monitor traffic as shown in block 263. In this way, process 250 is able to continually adapt to current traffic conditions.

While particular preferred and alternative embodiments of the present intention have been disclosed, it will be apparent to one of ordinary skill in the art that many various modifications and extensions of the above described technology may be implemented using the teaching of this invention described herein. All such modifications and extensions are intended to be included within the true spirit and scope of the invention as discussed in the appended claims.

What is claimed is:

1. A method for adaptively assigning unique words in a communication system, comprising:
   logically arranging a plurality of cell stations into a first cluster, the first cluster having a first pool of available unique words;
   assigning one or more unique words from the first pool to each cell station in the first cluster;
   logically arranging a second plurality of cell stations into a second cluster, the second cluster having a second pool of available unique words;
   assigning one or more unique words from the second pool to each cell station in the second cluster;
   determining that a heavy traffic condition exists in the first cluster;
   moving one or more cell stations from the first cluster to the second cluster, wherein said second cluster is an existing cluster;
   redistributing the unique words in the first pool among cell stations remaining in the first cluster so that the one or more cell stations with the heavy traffic condition have more unique words; and
   redistributing the unique words in the second pool among cell stations in the second cluster so that each of the one or more cell stations moved from the first cluster has at least one unique word from the second pool.

2. The method according to claim 1, further including the step of selecting the cell stations to be moved so that the cell stations to be moved are adjacent to cell stations in the second cluster.

3. A method for adaptively assigning unique words in a communication system, comprising:
   logically arranging a plurality of cell stations into a first cluster, the first cluster having a first pool of available unique words;
   assigning one or more unique words from the first pool to each cell station in the first cluster;
   logically arranging a second plurality of cell stations into a second cluster, the second cluster having a second pool of available unique words;
   assigning one or more unique words from the second pool to each cell station in the second cluster;
   determining that a heavy traffic condition exists in the first cluster and in the second cluster;
   moving one or more cell stations from the first cluster to a third cluster, wherein the third cluster is a newly formed cluster;
   moving one or more cell stations from the second cluster to the third cluster;
   redistributing the unique words in the first pool among cell stations remaining in the first cluster so that one or more cell stations with the heavy traffic condition have more unique words;
   redistributing the unique words in the second pool among cell stations remaining in the second cluster so that one or more cell stations with the heavy traffic conditions have more unique words; and
   distributing unique words from a third pool among cell stations in the third cluster so that each of the moved cells from the first cluster and the second cluster has at least one unique word from the third pool.

4. The method according to claim 3, further including the step of forming the third cluster responsive to determining that a heavy traffic condition exists.

5. The method according to claim 3, wherein the third cluster has only the cell stations moved from the first and second clusters.

6. The method according to claim 3, further including the step of selecting the cell stations to be moved so that each moved cell station is adjacent to another moved cell station.

7. The method according to claim 3, wherein at least one cell station from the first cluster is adjacent to at least one cell station in the third cluster.

8. The method according to claim 7, wherein the redistributing step further includes redistributing the unique words in the first cluster so that the adjacent cell stations have unique words with lower correlation.

9. A process for adaptively assigning unique words among a plurality of cell stations, comprising:
   arranging a first plurality of cell stations into a first cluster, the first cluster having a first pool of available unique words;
   assigning all available unique words of the first pool to the first plurality of cell stations of the first cluster;
   arranging a second plurality of cell stations into a second cluster, the second cluster having a second pool of available unique words;
   assigning all available unique words of the second pool to the second plurality of cell stations of the second cluster;
   reporting that a high traffic condition exists in the first cluster;
   receiving notification that at least a first cell station is moved from the first cluster to the second cluster;
   moving the first cell station from the first cluster to the second cluster;
   redistributing the first pool of available unique words among cell stations remaining in the first cluster; and
   redistributing the second pool of unique words among cell stations in the second cluster so that at least the first cell station which was moved from the first cluster to the second cluster has at least one unique word from the second pool.

* * * * *